United States Patent [19]

Koletnik et al.

[11] Patent Number: 5,463,939
[45] Date of Patent: Nov. 7, 1995

[54] HINGE FOR PIVOTALLY CONNECTING TWO TONGS OF A PAIR OF BAKING TONGS

[75] Inventors: Erich Koletnik, Klosterneuburg-Kierling; Franz Haas, Vienna; Johann Haas, Klosterneuburg, all of Austria

[73] Assignee: Franz Haas Waffelmaschinen Industriegesellschaft m.b.H., Vienna, Austria

[21] Appl. No.: 316,736

[22] Filed: Oct. 3, 1994

[30] Foreign Application Priority Data

Oct. 4, 1993 [AT] Austria .................................... 1988/93

[51] Int. Cl.⁶ .............................. A21B 5/02; A47J 37/01
[52] U.S. Cl. .................. 99/353; 99/372; 99/373; 99/374; 99/380; 99/427; 99/443 C
[58] Field of Search ............................. 99/353, 359, 372, 99/379, 380, 352, 373, 374, 381, 384, 426, 427, 428, 439, 443 C; 292/210, 256, 75, 304; 49/324; 425/451.5, 451.9, 450.1, 595, DIG. 221; 249/166, 168; 164/341

[56] References Cited

U.S. PATENT DOCUMENTS

| | | | |
|---|---|---|---|
| 4,308,790 | 1/1982 | Haas, Sr. et al. | 99/380 |
| 4,373,429 | 2/1983 | Haas, Sr. et al. | 99/375 |
| 4,417,508 | 11/1983 | Haas, Sr. et al. | 99/373 |
| 4,953,453 | 9/1990 | Haas, Sr. et al. | 99/373 |
| 5,103,717 | 4/1992 | Haas, Sr. et al. | 99/353 |
| 5,163,313 | 11/1992 | Haas, Jr. et al. | 99/353 |

*Primary Examiner*—Timothy F. Simone
*Attorney, Agent, or Firm*—Collard & Roe

[57] ABSTRACT

In a hinge for pivotally connecting the tongs of a pair of baking tongs, the hinge pin is rotatably mounted by means of at least one sliding surface bearing, which comprises sliding surfaces, which are in sliding contact with each other and are respectively provided on the hinge pin and on one of two members which are pivotally connected. One of said sliding surfaces comprises a sliding surface segment and is formed with openings adjoining said sliding surface segment on opposite sides thereof and with scraping edges, which are in sliding contact with the other of said sliding surfaces and define said openings and said sliding surface segment on opposite sides thereof.

10 Claims, 3 Drawing Sheets

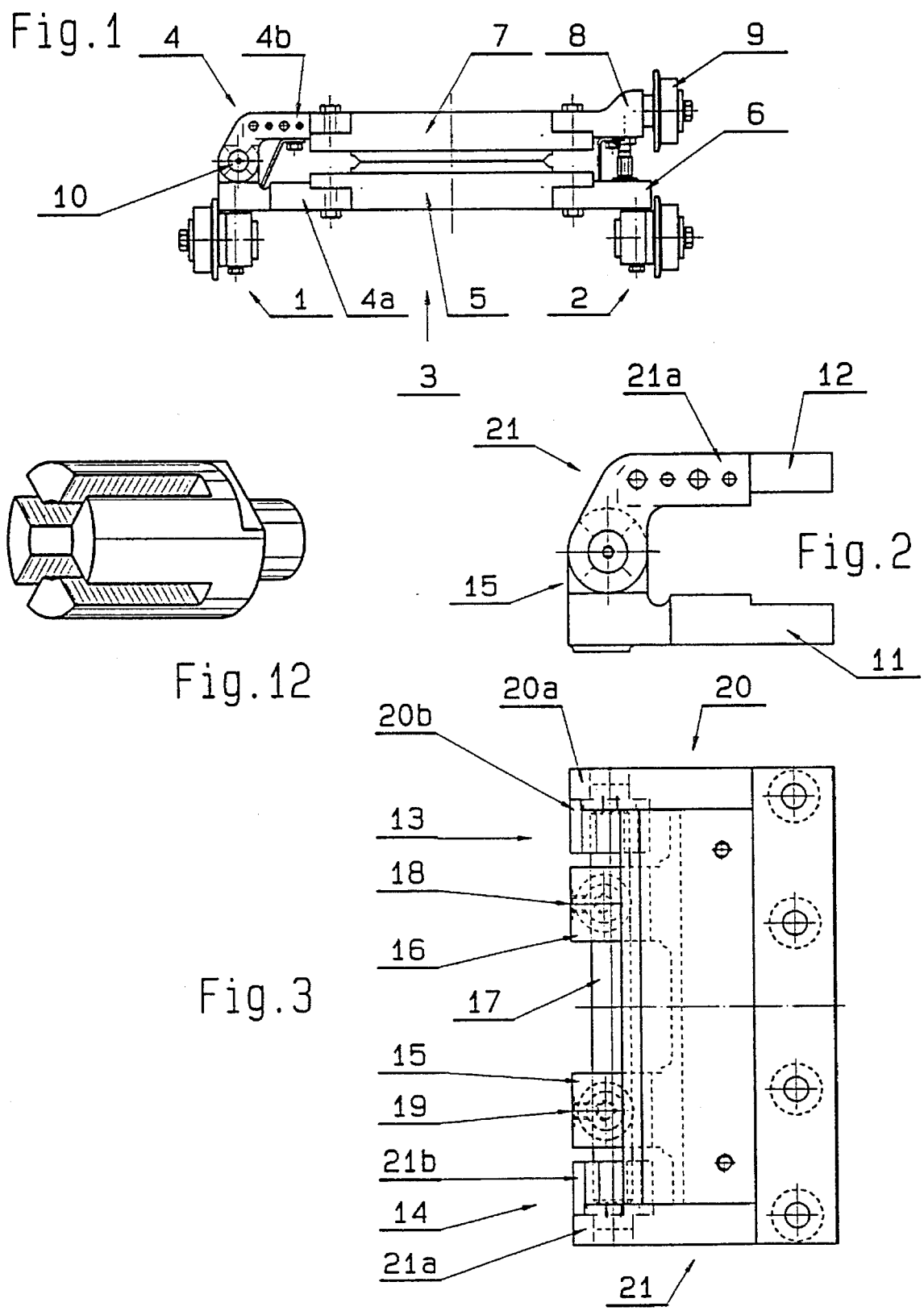

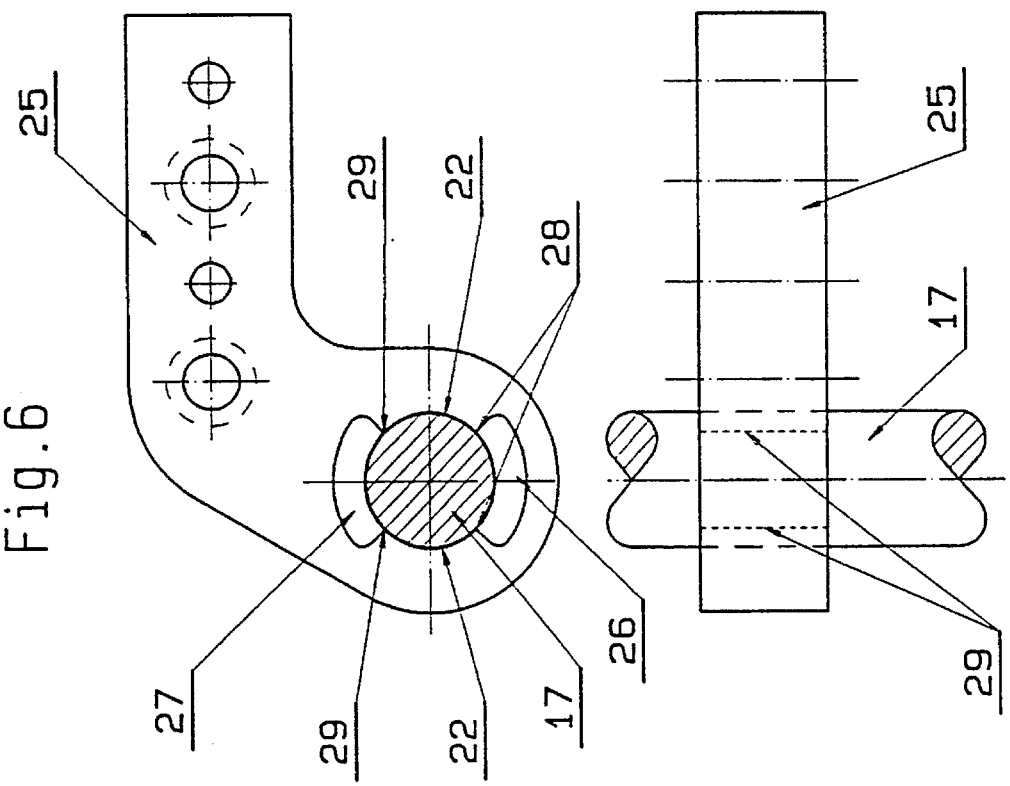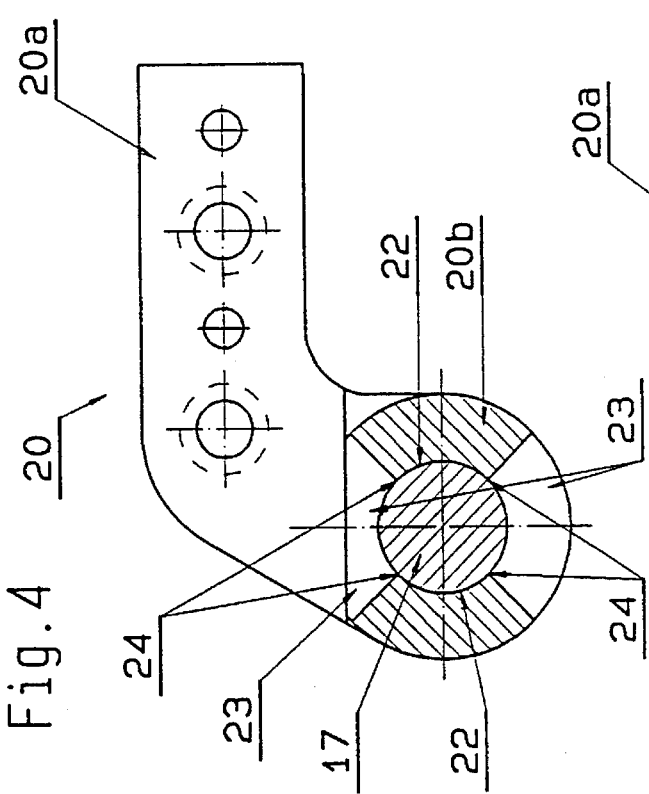

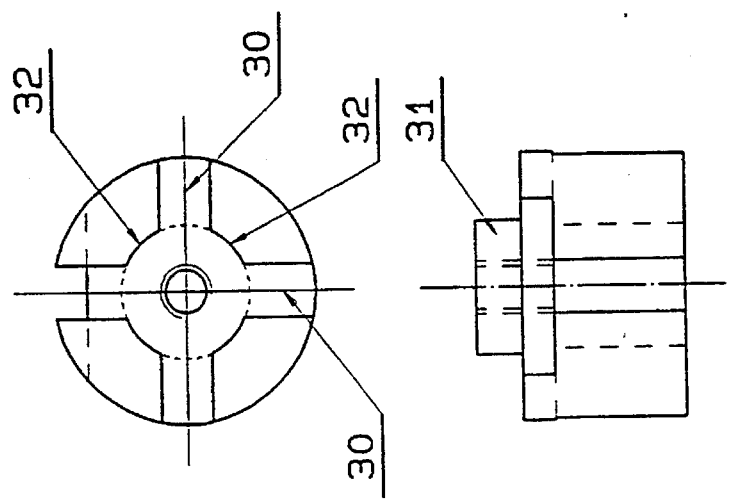
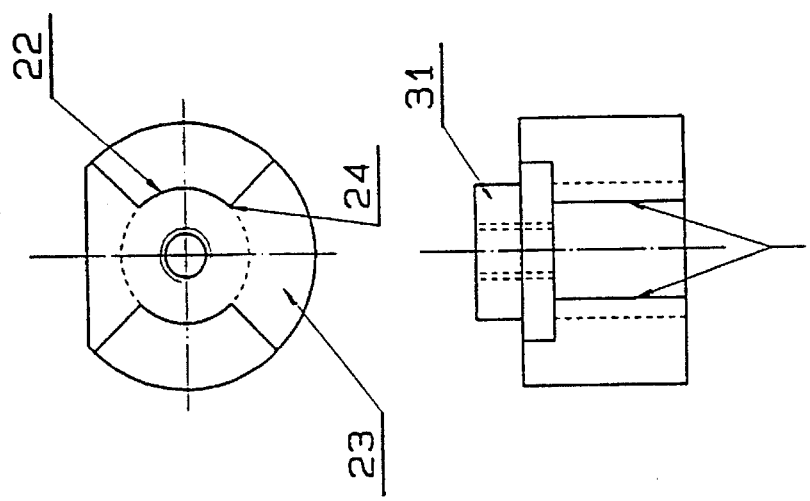
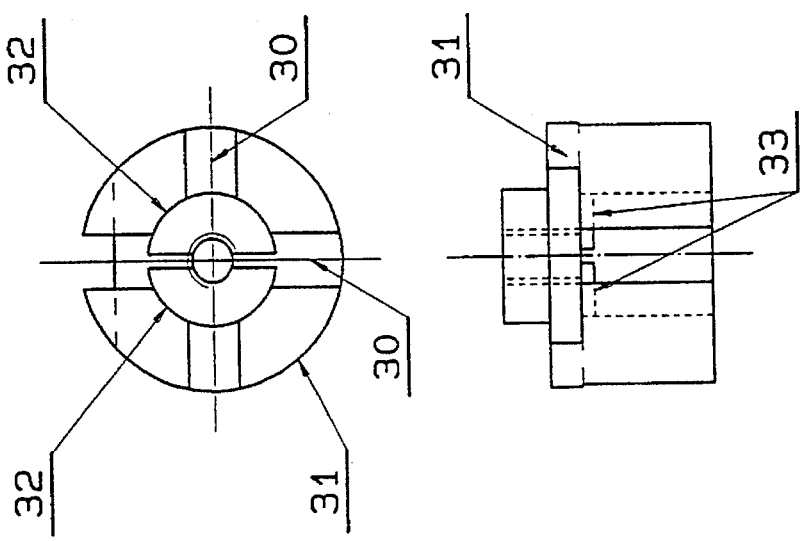

HINGE FOR PIVOTALLY CONNECTING TWO TONGS OF A PAIR OF BAKING TONGS

BACKGROUND OF THE INVENTION

1. Field of the Invention

This invention relates to hinges for baking tongs, such as are used in the foodstuffs and luxury food industry for the mass production of baked goods in baking ovens or baking machines, which in most cases are automatically operated.

2. Description of the Prior Art

In a known baking machine, structurally identical pairs of baking tongs are interconnected by two parallel endless conveyor chains to form an endless chain of baking tongs. That chain is trained around two reversing stations and moves in two superposed horizontal conveying planes through the baking chamber of the baking machine. That oven space or baking chamber is heat-insulated toward the outside and comprises heated interior sections. Each pair of baking tongs essentially consist of two baking plates, which are pivotally interconnected by a hinge. The lower of said baking plates is connected to the two laterally aligned conveyor chains. The upper baking plate is provided with a guide roller for swinging the pair of tongs to open and closed positions. The baking molds or their dough-treating surfaces are constituted by the confronting inside surfaces of the baking plates and when the baking tongs are closed the baking plates are parallel to each other and said baking molds define between them the cavities of the baking tongs. An individual flat piece of foodstuff is made in each mold cavity. To ensure in the mold cavity the temperatures in the range from 220° to 270° C. required to produce the flat piece of foodstuff, the baking tongs are heated by gas burners or infrared radiators, which are disposed in the baking chamber of the baking machine and apply heat to the outside surfaces of the baking plates.

During a continuous revolution of the chain of baking tongs the baking tongs are circulated in the baking machine from the feeding station, in which the tongs receive a given dough, through the baking chamber to the delivery station, in which the baked piece of foodstuff is delivered, and then back to the dough-feeding station. By means of the guide rollers, which are mounted on the upper baking plates and engage corresponding track rails of the baking machine, the baking tongs are opened before arriving at the delivery station and in an open state are conveyed to the dough-feeding station and after passing through the dough-feeding station are closed and are transported in a closed state through the baking chamber of the baking machine.

During a complete revolution of a pair of baking tongs their hinge is actuated only twice, in one instance to open the baking tongs before the delivery station and in another instance to close the baking tongs after passing through the dough-feeding station.

As a pair of baking tongs pass through a reversing station for the chain of baking tongs, the baking tongs are turned upside down so that those baking tongs which in the upper course of the chain of baking tongs move in the upper conveying plane of the baking machine are directly heated on the downwardly facing outside surfaces of their lower baking plates and those baking tongs which in the lower course of the chain of baking tongs move in the lower conveying plane are directly heated on the downwardly facing outside surfaces of their upper baking plates.

To minimize the size of the interior chamber of the baking oven or baking machine, the hinges of the baking tongs are closely adjacent to the directly heated baking plates so that heat is directly applied in the baking space of the baking machine by the flames of the gas burners or by the infrared radiators not only to the outside surfaces of the baking plates but also to the outside surfaces of the hinges of the baking tongs.

In a known pair of baking tongs the hinge comprises a first hinge member, which is fixedly joined to the lower baking plate and has an intermediate fixing eye, which protrudes above the lower baking plate and has a horizontal through bore for receiving the hinge pin, which is held against rotation in that through bore and protrudes from the fixing eye on both sides. The hinge comprises also a second hinge member, which is fixedly joined to the upper baking plate and which by means of two bearing eyes provided on both sides of the fixing eye is pivoted on the two ends of the hinge pin which laterally protrude from the fixing eye. Thrust bearings consisting of circular annular disks, which are rotatably mounted on the hinge pin, are provided between the bearing eyes and the fixing eye and are rotatably mounted on the hinge pin. Each bearing eye contains a bearing bushing, which surrounds the entire periphery of the hinge pin.

In another known pair of baking tongs the hinge comprises a first hinge member, which is fixedly joined to the lower baking plate and has three spaced apart coaxial horizontal through bores, which protrude above the lower baking plate and receive the hinge pin, and a second hinge member, which is fixedly joined to the upper baking plate and comprises two bearing eyes, each of which is disposed between two fixing eyes. In that hinge the hinge pin is fixed against rotation in one of the fixing eyes of the first hinge member, the bearing eyes of the second hinge member contain radial needle roller bearings, which roll on the surface of the hinge pin, and ball thrust bearings are provided between the bearing eyes and the fixing eyes.

In the baking tongs of such baking ovens or baking machines, foodstuff pieces are baked between the two baking plates of the baking tongs. Such food-stuff pieces may consist, e.g., of flat dough cakes or dough sheets, which have the shape of a disc or of a sector of a circle and have been made form liquid wafer dough having a high sugar content, or soft flat cakes of wafer dough, or pancakes filled with jam, or omelettes or pancakes etc.

In baking machines or automatic baking machines for making pancakes filled with jam or omelettes or pancakes, liquid edible fat or oil is sprayed onto the dough-treating surfaces of the baking tongs before the liquid dough for making jam-filled pancakes, omelettes and pancakes is poured onto the baking tongs. As a result, a mist of liquid edible fat or oil is formed during the operation of the baking machine in its baking space or oven space and the chain of baking tongs is moved through that mist so that that mist of liquid edible fat or oil will also deposit on the structural parts of the baking tongs to form a film of fat or oil.

Before the production begins the baking machine is heated up from room temperature to the operating temperature of the baking tongs in the range from 220° to 270° C. while the chain of baking tongs is revolving but the baking machine is not being charged, i.e., no dough is fed to the baking tongs. During that heating-up time the bearings clearances or gaps which are present in the hinges initially increase on size and subsequently decrease in size toward the end of the heating-up time and at the operating temperatures assume a desired value. A similar "breathing" of the bearing clearances and gaps in the hinges will take place during the cooling-down time after the end of production. After the end of production the baking machine while it is not being charged is cooled down from the operating temperature to room temperature. During that cooling-down time the bearing clearances and gaps in the hinges will initially decrease in size because the external hinge members cool more quickly than the interior hinge pins and will increase in size toward the end of the cooling-down time.

The fat or oil which has been applied as a release agent to the dough-treating surfaces of the baking plates is drawn into the gaps of the hinges during the production. While moving past the gas burners or infrared radiators the fat or grease is exposed to distinctly higher temperature than in the associated mold cavity or is directly exposed to the flames so that crusts are formed within said gaps.

When production has been terminated and the baking machine or baking oven is permitted to cool down while the chain of doughless baking tongs is revolving and the heating means are shut off whereas air is still sucked from the baking oven, said gaps contract and the crusts formed in the gaps are thus compacted. In dependence on the nature and size of the crusts that compaction will cause the baking tongs to be jammed sooner or later unless said gaps have been cleaned before in time. For this reason the entire production line must be shut down for a relatively long time so that the baking tongs of the baking machine, which is disposed at the upstream end of the production line, can entirely be taken apart and cleaned.

SUMMARY OF THE INVENTION

It is an object of the invention to eliminate the disadvantages which have been outlined hereinbefore and to provide for each pair of baking tongs of the baking machine a hinge which is adapted to substantially clean itself during the operation of the baking machine.

In a hinge for pivotally connecting the two tongs of a pair of baking tongs, which hinge comprises a first hinge member for fixation to one tong, a second hinge member for fixation to the other tong and at least one hinge pin, which is non-rotatably connected to one of the two hinge members and is rotatably mounted in the other hinge member, that object is accomplished in accordance with the invention in that the hinge pin is rotatably mounted by at least one sliding bearing, which is provided in one of the sliding surfaces at which the hinge pin and said other hinge member are in sliding contact with each other and, one of said sliding surfaces comprises at least one sliding surface segment, which is defined by scraping edges and adjoined by openings.

Owing to that design the scraping edges provided at the edges of each sliding surface segment scrape on the opposite sliding surface during any relative movement of the two hinge members of the hinge and any deposit on said opposite sliding surface will thus be scraped off. As the baking machine is cooling down, the scraping action of the scraping edges will increase as the bearing gaps between the sliding surface segment and the opposite sliding surfaces decrease in size. The deposits, crusts, etc. which have been scraped off by the scraping edges are received and carried off in the openings which are formed in the sliding surfaces at the scraping edges.

According to a further feature of the invention the hinge pin may be rotatably mounted by means of at least two coaxial cylindrical sliding surface segments, which are separated from each other by axial grooves, slots or the like. In dependence on the pivotal movement to be performed by each pair of baking tongs, said cylindrical sliding surface segments and the intervening grooves, slots or the like may be so designed that the entire portion of the hinge which is involved in the opening and closing of the pair of baking tongs will be cleaned.

According to a further feature of the invention the hinge pin may be axially fixed in the sliding bearing by at least one sliding surface segment, which is defined by scraping edges and engages a radial sliding surface of the hinge pin. The hinge pin may be fixed in position by a single sliding surface segment, which extends only over a part of the radial sliding surface of the hinge pin, or by a plurality of sliding surface segments, which are separated from each other by recesses, slots or the like.

According to a further feature of the invention the sliding surface segments defined by scraping edges are formed on the inside surface of a hinge member portion of a given hinge member, which hinge member portion surrounds the hinge pin at least in part.

According to a further feature of the invention the sliding surface segments defined by scraping edges may be formed on the inside surface of a one-piece bearing bushing, which is axially slidably mounted on the hinge pin and is non-rotatably connected to a given hinge member.

BRIEF DESCRIPTION OF THE DRAWING

FIG. 1 is a schematic end elevation showing a closed pair of baking tongs.

FIG. 2 is a side elevation showing the hinge of the pair of baking tongs of FIG.1.

FIG. 3 is a top plan view of the hinge of FIG. 2.

FIG. 4 is a side elevation of a hinge member, which constitutes a separate member and is slidably mounted on one end of a hinge pin and is integrally formed with a bearing bushing.

FIG. 5 is a top plan view showing a hinge member which corresponds to that shown in FIG. 4 and is provided with a bearing bushing, which has been inserted into a recess of the hinge member, which recess is formed with a flat.

FIG. 6 shows a one-piece hinge member containing a continuous hinge pin.

FIG. 7 is a top plan view of the hinge member of FIG. 6.

FIG. 8 is an end elevation showing the bearing bushing which has been inserted into the hinge member shown in FIG. 5 and comprises two cylinder segments.

FIG. 9 is a top plan view of the bearing bushing of FIG. 8.

FIG. 10 is an end elevation showing a bearing bushing comprising four cylinder segments.

FIG. 11 is a top plan view of the bearing bushing of FIG. 10.

FIG. 12 is a perspective view showing the bearing bushing of FIG. 12.

FIG. 13 is an end elevation showing a bearing bushing having radial sliding surface segments.

FIG. 14 is a top plan view of the bearing bushing of FIG. 13.

DETAILED DESCRIPTION OF THE PREFERRED EMBODIMENTS

The invention will now be explained more in detail with reference to illustrative embodiments shown in the drawing.

FIG. 1 is an end view showing the upper chain course of a chain of baking tongs of an automatic baking machine. A pair of baking tongs 3 are laterally secured to the link plates of the two laterally aligned conveyor chains 1, 2 of the automatic baking machine. Said conveyor chains consist of plate link chains and are provided with laterally aligned rollers. The pair of baking tongs 3 comprise a lower tong, which is connected to the two conveyor chains 1, 2, and an upper tong, which is pivoted to the lower tong by a hinge assembly 4. The lower tong essentially consists of the lower baking plate 5, the top surface of which constitutes a lower baking mold half, a lower hinge bracket 4a, which is secured to conveyor chain 1 and to one side edge of the lower baking plate 5, and a bracket 6, which is secured to the opposite side edge of the lower baking plate 5 and the other laterally aligned conveyor chain 2. The upper tong essentially consists of the upper hinge bracket 4b, the upper baking plate 7, which is secured to the upper hinge bracket 4b and the bottom surface of which constitutes an upper baking mold half, and a bracket 8, which is secured to that side edge of the upper baking plate 7 which is opposite to the hinge assembly 4. The bracket 8 carries the guide roller 9, which is engageable with the track rails of the baking machine in order to open and close the pair of baking tongs.

In dependence on the length of each pair of baking tongs in the longitudinal direction of the conveyor chains 1, 2, i.e., in the direction of travel of the chain of baking tongs, the hinge assembly 4 comprises two or more hinge sections, which comprise hinge members, which are pivotally connected by a hinge pin 10. Each hinge member is integral with the lower hinge bracket 4a or the upper hinge bracket 4b or consists of a separate part of the hinge assembly and is fixed to the upper hinge bracket 4a or the upper hinge bracket 4b.

The hinge assembly shown in FIGS. 2 and 3 consists of a lower hinge bracket 11, an upper hinge bracket 12, and two hinge sections 13, 14, by which said hinge brackets 11 and 12 are pivotally connected. Each hinge section 13, 14 comprises a first hinge member, which is integral with the lower hinge bracket of the hinge assembly and is formed with fixing eye 15, 16 having a horizontal through bore for receiving a one-piece hinge pin 17, which is common to both hinge sections 13, 14 and is received by the through bores of the two fixing eyes 15, 16 and is fixed against rotation by set screws 18, 19. Each hinge section 13, 14 also comprises a second hinge member 20, 21, which is slidably fitted on the adjacent end of the hinge pin and is fixed to the upper hinge bracket 12 of the hinge assembly. Each of the two second hinge members of the two hinge sections 13, 14 comprises a fixing portion 20a, 21a, which is laterally fixed by screws to the upper hinge bracket 12, and bearing bushing 20b, 21b, which has been non-rotatably inserted into a recess of the associated fixing portion 20a, 21a and is slidably fitted on one of the ends of the hinge pin 17.

Each bearing bushing 20b, 21b of each hinge section 13, 14 comprises two cylindrical sliding surface segments 22. The cylindrical segments and the hinge pin 17 are coaxially arranged and the segments are separated by axially extending openings 23 and have axial scraping edges 24 at their opposite sides (FIGS. 4, 5). Said cylindrical sliding surface segments 22 are in sliding contact with the peripheral surface of the hinge pin 17 and surrounds the hinge pin only in part. The openings 23 by which the two sliding surface segments 22 of the cylindrical bearing bushing 20b, 21b are separated are radial slots, which extend radially through the wall of the bushing 20b, 21b and flare radially outwardly.

FIGS. 6 and 7 show another embodiment of a second hinge member 25 of the hinge section 13, 14. The second hinge member 25 is formed with a through bore for receiving the hinge pin 17 and with two openings 26, 27, which radially adjoin the through bore and extend axially through the second hinge member and between them define a cylindrical sliding surface segment on the inside surface of the through bore. Each sliding surface segment has two axially extending scraping edges 28, 29, for scraping on the peripheral surface of the hinge pin. The second hinge member shown in FIGS. 6 and 7 entirely surrounds the hinge pin 17 but contacts its peripheral surface only in part with the two cylindrical sliding surface segments. The lower opening 26 may consist of a slot, which extends radially through the second hinge member 25, which in that case extends only around a part of the hinge pin.

A bearing bushing 20b, 21b, 31, which has been inserted into the second hinge member, need not consist of only two cylindrical sliding surface segments as shown in FIGS. 4, 5, 8 and 9, but may alternatively consist of a bearing bushing 31, which has four radial slots 30 and four coaxial cylindrical sliding surface segments 32 for contacting the hinge pin (FIGS. 10 to 12).

The hinge pin may be axially fixed in position in the hinge assembly by means of one or two sliding surface segments 33, which are formed in the bearing bushing 31 at its end or ends and have the shape of a circular ring and have scraping edges (FIGS. 13, 14) engaged by a radial sliding surface constituted by the end face of the hinge pin 17.

Within the scope of the invention it is preferred to provide a smooth-surfaced hinge pin and scraping edges formed on the inside surfaces of the bearing bushings. It will be understood that scraping edges may optionally be provided also on the peripheral surface of the hinge pin and may be constituted, e.g., by edges of axial grooves.

We claim:

1. A hinge for pivotally connecting first and second baking tongs parts, which comprises
   (a) a first hinge member,
   (b) a second hinge member,
   (c) a hinge pin non-rotatably affixed to the first hinge member, and the second hinge member being rotatably mounted on the hinge pin for pivoting about a longitudinal axis of the hinge pin, and
   (d) the hinge bolt and the second hinge member defining a sliding bearing therebetween, the sliding bearing comprising
      (1) at least two cooperating sliding surfaces respectively formed on the hinge pin and on the second hinge member,
      (2) one of the sliding surfaces comprising at least one sliding surface segment in sliding contact with a second one of the sliding surfaces, and openings adjoining each sliding surface segment and providing no sliding contact with the second sliding surface, and
      (3) scraping edges on the sliding surface segment adjacent the openings, any movement of the second hinge member relative to the hinge pin causing the scraping edges to slide over the second sliding surface.

2. The hinge of claim 1, wherein the second sliding surface is a cylindrical surface of the hinge bolt and the one sliding surface comprises at least two of said sliding surface segments, the sliding surface segments being cylindrical and coaxial with the hinge pin, and the openings being extended axially to separate the sliding surface segments from each other.

3. The hinge of claim 1, wherein the sliding bearing is arranged to fix the axial position of the hinge bolt, and the sliding surfaces extend radially.

4. The hinge of claim 1, wherein the second hinge member has a hinge section which at least partially surrounds the hinge pin to form the sliding bearing, and the hinge section has an inside surface constituting the one sliding surface.

5. The hinge of claim 1, wherein the second hinge member comprises a bearing bushing non-rotatably connectable to the second hinge member and axially slidable onto the hinge pin, the bearing bushing forming the sliding bearing with the hinge pin and having an inside surface constituting the one sliding surface.

6. A pair of baking tongs comprising first and second parts and a hinge pivotally connecting the baking tongs parts, the hinge comprising
   (a) a first hinge member connected to the first baking tongs part,
   (b) a second hinge member connected to the second baking tongs part,
   (c) a hinge pin non-rotatably affixed to the first hinge member, and the second hinge member being rotatably mounted on the hinge pin for pivoting about a longitudinal axis of the hinge pin, and
   (d) the hinge bolt and the second hinge member defining a sliding bearing therebetween, the sliding bearing comprising
      (1) at least two cooperating sliding surfaces respectively formed on the hinge pin and on the second hinge member,
      (2) one of the sliding surfaces comprising at least one sliding surface segment in sliding contact with a second one of the sliding surfaces, and openings adjoining each sliding surface segment at respective sides thereof and providing no sliding contact with the second sliding surface, and
      (3) scraping edges on the sliding surface segment adjacent the openings, any movement of the second hinge member relative to the hinge pin causing the scraping edges to slide over the second sliding surface.

7. The baking tongs of claim 6, wherein the second sliding surface is a cylindrical surface of the hinge bolt and the one sliding surface comprises at least two of said sliding surface segments, the sliding surface segments being cylindrical and coaxial with the hinge pin, and the openings being extending axially to separate the sliding surface segments from each other.

8. The baking tongs of claim 6, wherein the sliding bearing is arranged to fix the axial position of the hinge bolt, and the sliding surfaces extend radially.

9. The baking tongs of claim 6, wherein the second hinge member has a hinge section which at least partially surrounds the hinge pin to form the sliding bearing, and the hinge section has an inside surface constituting the one sliding surface.

10. The baking tongs of claim 6, wherein the second hinge member comprises a bearing bushing non-rotatably connectable to the second hinge member and axially slidable onto the hinge pin, the bearing bushing forming the sliding bearing with the hinge pin and having an inside surface constituting the one sliding surface.

* * * * *